US012752372B2

(12) United States Patent
Nomura et al.

(10) Patent No.: US 12,752,372 B2
(45) Date of Patent: Oct. 6, 2026

(54) LASER BEAM IRRADIATION APPARATUS

(71) Applicant: DISCO CORPORATION, Tokyo (JP)

(72) Inventors: Teppei Nomura, Tokyo (JP); Zhiwen Chen, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 812 days.

(21) Appl. No.: 18/194,777

(22) Filed: Apr. 3, 2023

(65) Prior Publication Data

US 2023/0321753 A1 Oct. 12, 2023

(30) Foreign Application Priority Data

Apr. 11, 2022 (JP) ................................ 2022-065353

(51) Int. Cl.
*B23K 26/062* (2014.01)
*B23K 26/50* (2014.01)

(52) U.S. Cl.
CPC .......... *B23K 26/0626* (2013.01); *B23K 26/50* (2015.10)

(58) Field of Classification Search
CPC ............................ B23K 26/0626; B23K 26/50
See application file for complete search history.

(56) References Cited

U.S. PATENT DOCUMENTS

2016/0193692 A1* 7/2016 Regaard ............... B23K 31/125 219/121.62

FOREIGN PATENT DOCUMENTS

| | | | | | |
|---|---|---|---|---|---|
| CN | 112518110 A | * | 3/2021 | ........... B23K 26/702 |
| JP | 2003080389 A | * | 3/2003 | |
| JP | 2008177240 A | | 7/2008 | |
| JP | 2021102217 A | * | 7/2021 | ............. G02B 27/30 |
| JP | 2021115613 A | * | 8/2021 | |
| WO | WO-2022138581 A1 | * | 6/2022 | ........... B23K 26/364 |

OTHER PUBLICATIONS

Office Action issued in counterpart Japanese patent application No. 2022-065353, dated Jan. 6, 2026.

* cited by examiner

*Primary Examiner* — Ryan C Clark
(74) *Attorney, Agent, or Firm* — Greer Burns & Crain Ltd.

(57) ABSTRACT

A laser beam irradiation unit of a laser beam irradiation apparatus includes a laser beam source that emits a laser beam and a spatial light modulator that modulates the laser beam emitted from the laser beam source, according to a phase pattern, and that emits the laser beam. A controller has a storing section that stores the phase pattern to be displayed in the spatial light modulator and a rotation instructing section that rotates the phase pattern stored in the storing section. The controller uniformizes the power density of the laser beam with which a plate-shaped workpiece is irradiated, by rotating the phase pattern while the plate-shaped workpiece is irradiated with the laser beam.

4 Claims, 5 Drawing Sheets

LASER BEAM IRRADIATION APPARATUS

BACKGROUND OF THE INVENTION

Field of the Invention

The present invention relates to a laser beam irradiation apparatus.

Description of the Related Art

In a process of a semiconductor device, as one of systems for electrically connecting a chip and an external terminal to each other, there is a flip-chip mounting system in which an electrode of a chip and an electrode on a package substrate are made to face each other and are connected to each other through a bump.

In general, in the flip-chip mounting, a mass reflow process in which bonding is executed by heating the whole of a substrate, a thermo-compression bonding (TCB) process in which bonding is executed by heating and pressurizing each chip, and so forth are employed. However, in the mass reflow process, heat stress due to heating of the whole of a substrate is a problem. In the TCB process, poor productivity due to a long time required for cooling of a bonder head, for example, is a problem.

As a process having superiority over the above-described processes, a laser reflow process in which a chip is connected to an electrode on a substrate by laser irradiation has been proposed (refer to Japanese Patent Laid-open No. 2008-177240 and Japanese Patent Laid-open No. 2021-102217). In the laser reflow process, there are advantages that heat stress can be reduced because heat is not applied to the whole of a substrate and that higher productivity than the TCB process is obtained by irradiating a plurality of chips with a laser beam.

SUMMARY OF THE INVENTION

Incidentally, when the intensity profile of the laser beam is not uniform at a processing point, there is a possibility that, since a chip is heated according to this intensity profile, heating unevenness occurs and bonding failure thus occurs.

Accordingly, an object of the present invention is to provide a laser beam irradiation apparatus that can suppress connection failure attributed to the intensity profile.

In accordance with an aspect of the present invention, there is provided a laser beam irradiation apparatus including a holding table that holds a plate-shaped workpiece, a laser beam irradiation unit that irradiates the plate-shaped workpiece held by the holding table with a laser beam, and a controller that controls the laser beam irradiation unit. The laser beam irradiation unit includes a laser beam source that emits the laser beam and a spatial light modulator that modulates the laser beam emitted from the laser beam source, according to a phase pattern, and that emits the modulated laser beam. The controller has a storing section that stores the phase pattern to be displayed in the spatial light modulator and a rotation instructing section that rotates the phase pattern stored in the storing section. The controller uniformizes the power density of the laser beam with which the plate-shaped workpiece is irradiated, by rotating the phase pattern while the plate-shaped workpiece is irradiated with the laser beam.

Preferably, the laser beam irradiation unit further includes an image forming unit that executes image formation of the laser beam modulated by the spatial light modulator, to execute irradiation of the plate-shaped workpiece.

Preferably, the plate-shaped workpiece includes a substrate over which a plurality of semiconductor chips having bumps on one surface are mounted with the interposition of the bumps, and reflow of the bumps included in an irradiated range of the laser beam is caused by irradiating a region corresponding to the semiconductor chip mounted over the substrate with the laser beam.

The present invention can suppress connection failure attributed to the intensity profile.

The above and other objects, features and advantages of the present invention and the manner of realizing them will become more apparent, and the invention itself will best be understood from a study of the following description and appended claims with reference to the attached drawings showing a preferred embodiment of the invention.

BRIEF DESCRIPTION OF THE DRAWINGS

FIG. 3 is irradiated with the laser beam;

FIG. 3 is irradiated;

DETAILED DESCRIPTION OF THE PREFERRED EMBODIMENT

An embodiment of the present invention will be described in detail below with reference to the drawings. The present invention is not limited by contents described in the following embodiment. Further, what can easily be envisaged by those skilled in the art and what are substantially the same are included in constituent elements described below. Moreover, configurations described below can be combined as appropriate. In addition, various kinds of omission, replacement, or change of a configuration can be carried out without departing from the gist of the present invention.

Figure 1:
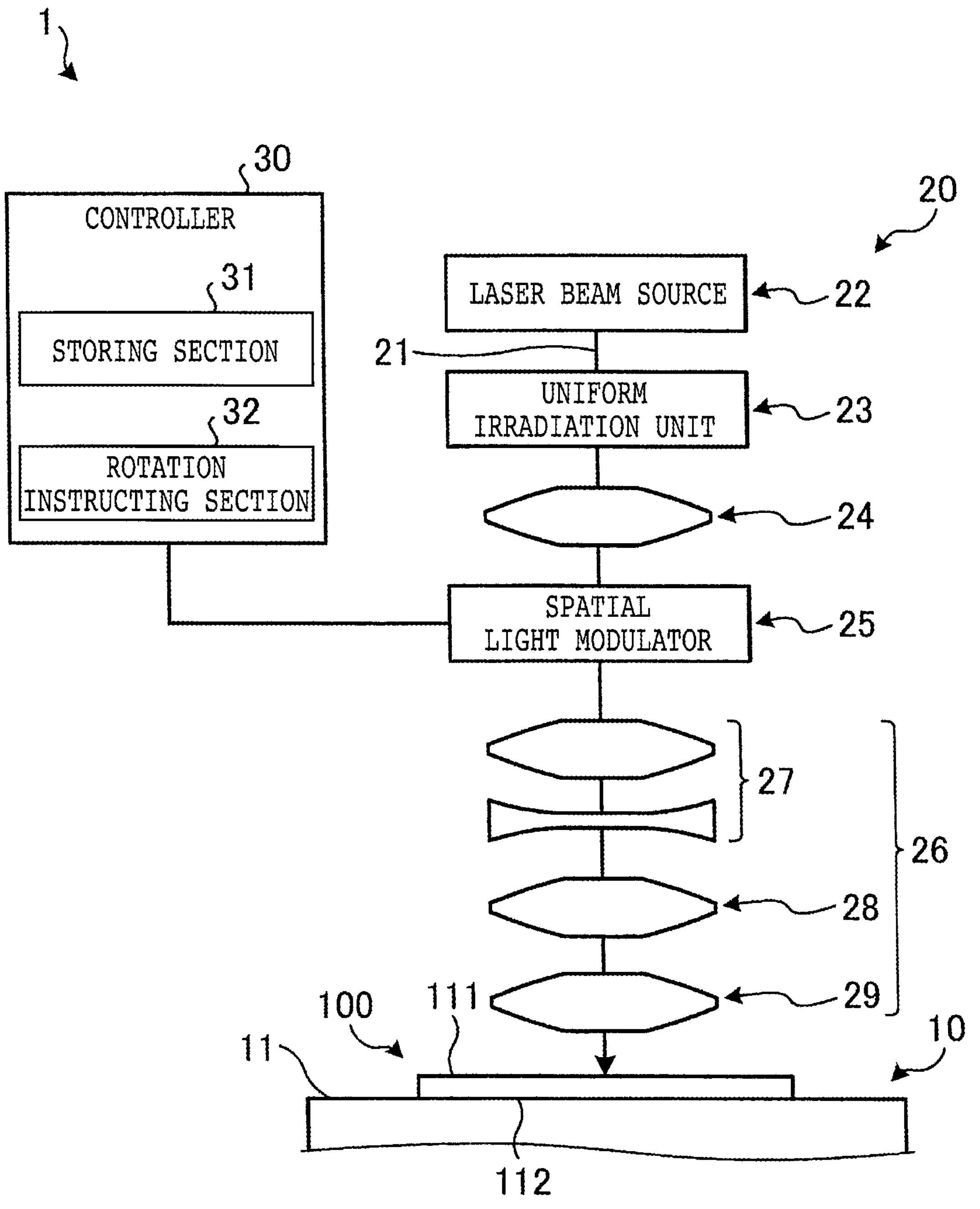
FIG. 1 is a schematic diagram illustrating a configuration example of a laser beam irradiation apparatus according to an embodiment.
Figure 2:
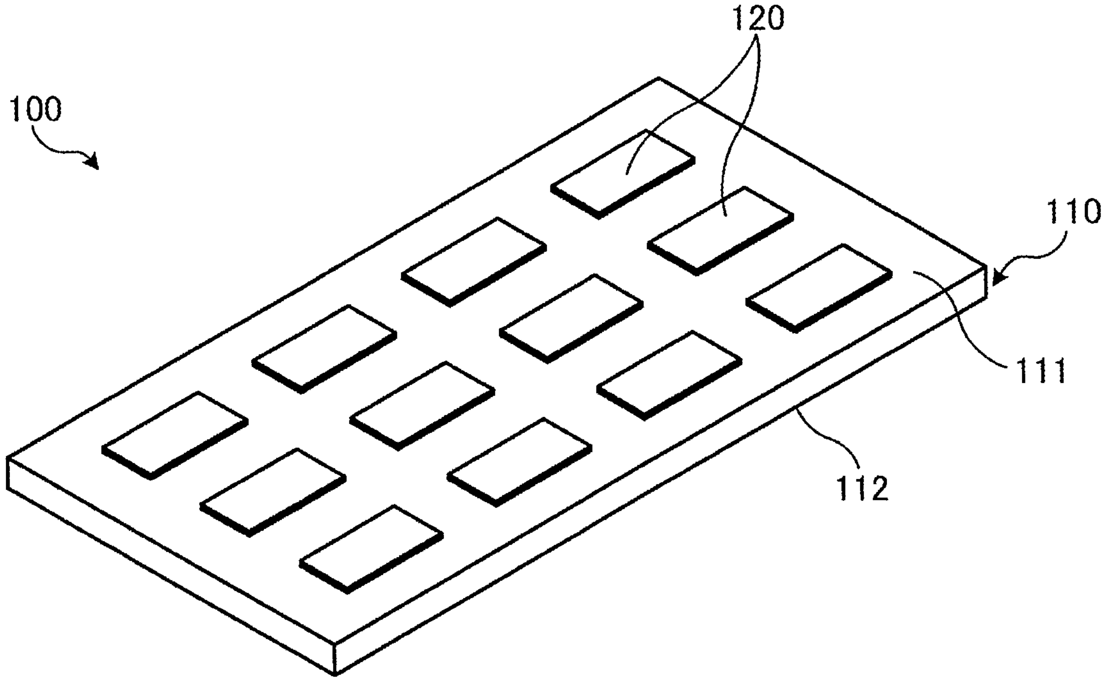
FIG. 2 is a perspective view illustrating one example of a plate-shaped workpiece as an irradiation target of a laser beam applied by the laser beam irradiation apparatus illustrated in FIG. 1.

A laser beam irradiation apparatus 1 according to an embodiment of the present invention will be described based on drawings. FIG. 1 is a schematic diagram illustrating a configuration example of the laser beam irradiation apparatus 1 according to the embodiment. FIG. 2 is a perspective view illustrating one example of a plate-shaped workpiece 100 as an irradiation target of a laser beam 21 applied by the laser beam irradiation apparatus 1 illustrated in FIG. 1. FIG.

3 is a sectional view of the major part of the plate-shaped workpiece 100 illustrated in FIG. 2.

The laser beam irradiation apparatus 1 of the embodiment includes a holding table 10, a laser beam irradiation unit 20, and a controller 30. The laser beam irradiation apparatus 1 is an apparatus that irradiates the plate-shaped workpiece 100 held by the holding table 10 with the laser beam 21. The laser beam irradiation apparatus 1 may further include a movement unit, an imaging unit, a display unit, and so forth that are not illustrated. The movement unit relatively moves the holding table 10 and the laser beam irradiation unit 20. The imaging unit images the plate-shaped workpiece 100 held by the holding table 10. The display unit causes a display surface to display a setting screen of a processing condition, the state of the plate-shaped workpiece 100 imaged by the imaging unit, the state of processing operation, and so forth, for example.

Figure 3:
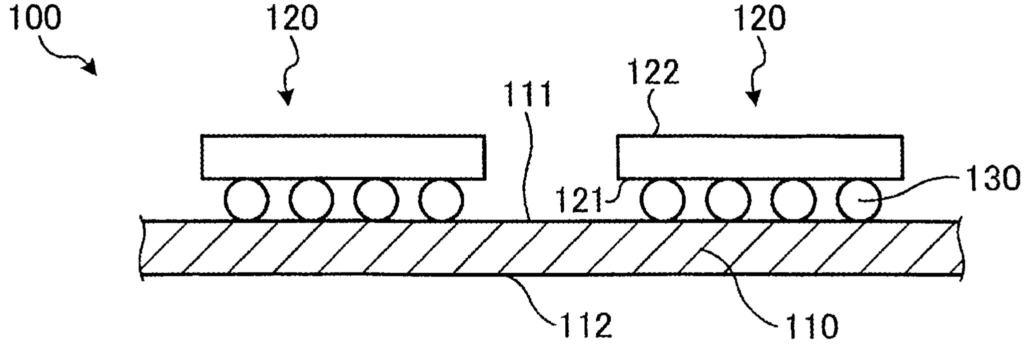
FIG. 3 is a sectional view of the major part of the plate-shaped workpiece illustrated in FIG. 2.

In the embodiment, the plate-shaped workpiece 100 illustrated in FIG. 2 and FIG. 3 is a workpiece that includes a substrate 110 and semiconductor chips 120 placed over the substrate 110 with the interposition of bumps 130 and in which the semiconductor chips 120 are planned to be flip-mounted to the substrate 110 by causing reflow of the bumps 130 by the laser beam 21. That is, the laser beam irradiation apparatus 1 of the embodiment is an apparatus that can cause reflow of the bumps 130 and connect the semiconductor chips 120 to the substrate 110 by irradiating the semiconductor chips 120 placed over the substrate 110 of the plate-shaped workpiece 100 held by the holding table 10 with the laser beam 21.

The substrate 110 has a rectangular shape in the embodiment. For example, the substrate 110 is a printed circuit board (PCB) substrate, a device wafer that has not yet been divided into chips, or the like. A plurality of semiconductor chips 120 are disposed on the side of a front surface 111 of the substrate 110 with the interposition of the bumps 130. The semiconductor chips 120 each have one or more bumps 130 on a front surface 121. The bumps 130 are protrusion-shaped terminals disposed on the front surfaces 121 of the semiconductor chips 120.

The semiconductor chips 120 are connected to electrodes on the substrate 110 through heating of the substrate 110 and the semiconductor chips 120 and melting of the bumps 130. The plate-shaped workpiece 100 may be an object in which a plurality of semiconductor chips 120 are stacked and the bumps 130 are present between the semiconductor chips 120, for example, besides the object in which the semiconductor chips 120 are arranged over the substrate 110 with the interposition of the bumps 130 in the embodiment.

The holding table 10 illustrated in FIG. 1 holds the plate-shaped workpiece 100 by a holding surface 11. The holding surface 11 is formed of porous ceramic or the like and has a circular plate shape, for example. The holding surface 11 is a flat surface parallel to the horizontal direction in the embodiment. The holding surface 11 connects to a vacuum suction source through a vacuum suction path, for example. The holding table 10 holds under suction the plate-shaped workpiece 100 placed on the holding surface 11.

The plate-shaped workpiece 100 is held by the holding table 10 in the state in which the semiconductor chips 120 are placed over the substrate 110. At this time, the semiconductor chips 120 are placed, with the interposition of the bumps 130, on the side of the front surface 111 of the substrate 110 in which the side of the front surface 111 is oriented upward in the state in which the one surface (the front surface 121) having the bumps 130 is oriented downward.

The laser beam irradiation unit 20 is a unit that irradiates the plate-shaped workpiece 100 held by the holding table 10 with the laser beam 21. As illustrated in FIG. 1, the laser beam irradiation unit 20 includes a laser beam source 22, a uniform irradiation unit 23, a light guide unit 24, a spatial light modulator 25, and an image forming unit 26.

The laser beam source 22 emits the laser beam 21. For example, the laser beam source 22 includes a single light source having a fiber laser or a single laser diode (LD), a multi-light source in which a plurality of LDs are disposed, or the like. The laser beam 21 emitted from the laser beam source 22 is a continuous wave (CW) with a wavelength having absorbability with respect to the plate-shaped workpiece 100 (the semiconductor chip 120).

The uniform irradiation unit 23 is disposed at the subsequent stage of the laser beam source 22. The uniform irradiation unit 23 is what is for forming a uniform irradiation plane for the spatial light modulator 25 to be described later, by the laser beam 21 emitted from the laser beam source 22. In this uniform irradiation plane, uniformization of the power density of the laser beam 21 is caused. The "uniformization" is not limited to one by which the power density becomes completely uniform as a result, and includes one by which the power density changes to get close to "uniformity" compared with the original state.

It is particularly preferable for the uniform irradiation unit 23 to be disposed when the laser beam source 22 is a multi-light source. Also when the laser beam source 22 is a single light source, in the case of a light source that assumes a Gaussian distribution, it is preferable for the uniform irradiation unit 23 to be disposed in order to make a complete top-hat distribution. Further, even in the case of a light source that assumes a top-hat distribution, it is preferable for the uniform irradiation unit 23 to be disposed in order to make a more complete top-hat distribution.

As the uniform irradiation unit 23, for example, the following units can be used: a unit by which the uniform irradiation plane is formed by a combination of a collimating lens and an aspheric lens; a unit by which the uniform irradiation plane is formed by a combination of a collimating lens, a diffractive optical element (DOE), and a collecting lens; a unit by which the uniform irradiation plane is formed by a combination of a rod lens (a tubular member formed of glass) or a light pipe (a hollow tubular member surrounded by a mirror and referred to also as a homogenizer rod) and a light guide unit (a relay lens or an optical fiber); a unit by which the uniform irradiation plane is formed by a combination of a collimating lens, a first lens array and a second lens array (what are a plurality of rod lenses bundled together to form an array of lenses or what are obtained by surface processing of a lens to be shaped into an array of lenses), and a collecting lens; and so forth.

The light guide unit 24 is a unit for transferring light of the uniform irradiation plane formed by the uniform irradiation unit 23, to the spatial light modulator 25. In a case where the laser beam irradiation unit 20 does not include the uniform irradiation unit 23, the light guide unit 24 transfers direct light from the laser beam source 22 to the spatial light modulator 25. The light guide unit 24 includes an optical fiber or a relay lens (a coupling lens), for example.

The spatial light modulator 25 includes a spatial light modulation element. The spatial light modulator 25 modulates the laser beam 21 emitted from the laser beam source 22, according to a displayed phase pattern, and emits the modulated laser beam 21. The spatial light modulator 25 is what modulates the laser beam 21 by controlling the spatial density distribution of the intensity (the power density) of the emitted laser beam 21 and is referred to as what is generally called an SLM.

The spatial light modulator 25 rotates the profile of the laser beam 21 with which an irradiation-target surface of the plate-shaped workpiece 100 is irradiated, by rotating the displayed phase pattern. As the spatial light modulator 25, a well-known SLM device such as well-known reflective liquid crystal (liquid crystal on silicon (LCOS)), transmissive liquid crystal (a liquid crystal panel (LCP)), a deformable mirror, and a digital micro-mirror device (DMD) can be used, for example. The spatial light modulator 25 of the embodiment is an LCOS.

The image forming unit 26 executes image formation of the incident laser beam 21 on the irradiation-target surface of the plate-shaped workpiece 100. The laser beam irradiation unit 20 of the embodiment executes image formation of the laser beam 21 in regions 123 (see FIG. 4) corresponding to back surfaces 122 of the semiconductor chips 120 in the plate-shaped workpiece 100 on the holding table 10. In the laser beam irradiation unit 20, irradiation may be simultaneously executed for the plurality of semiconductor chips 120. The image forming unit 26 of the embodiment includes an image forming system 27, a magnifying image forming lens 28, and a telecentric lens 29.

The image forming system 27 includes an image forming lens formed of a single lens or a coupling lens and, in one example illustrated in FIG. 1, includes a biconvex lens and a biconcave lens sequentially disposed. The image forming system 27 may be omitted in a case where the spatial light modulator 25 also has functions of the image forming system 27 (the image forming lens) by the spatial light modulation element.

The magnifying image forming lens 28 is what magnifies an image (a conjugate image) formed by the image forming system 27 and forms an image on the irradiation-target surface of the plate-shaped workpiece 100. The magnifying image forming lens 28 may be omitted.

The telecentric lens 29 is what is for causing the laser beam 21 to be perpendicularly incident on the irradiation-target surface of the plate-shaped workpiece 100, that is, for causing the laser beam 21 to be incident in parallel to the optical axis. It is also possible to configure the image forming system 27 in the telecentric lens 29. Further, the optical system may be configured with omission of the telecentric lens 29.

The controller 30 controls each of the constituent elements of the laser beam irradiation apparatus 1 and causes the laser beam irradiation apparatus 1 to execute processing operation for the plate-shaped workpiece 100, for example. The controller 30 is a computer including a calculation processing device as calculating means, a storing device as storing means, and an input-output interface device as communication means. The calculation processing device includes a microprocessor such as a central processing unit (CPU), for example. The storing device has a memory such as a read only memory (ROM) or a random access memory (RAM). The calculation processing device executes various calculations on the basis of a predetermined program stored in the storing device. The calculation processing device outputs various control signals to the above-described respective constituent elements through the input-output interface device according to a calculation result to execute control of the laser beam irradiation apparatus 1. The controller 30 has a storing section 31 and a rotation instructing section 32.

The storing section 31 stores the phase pattern to be displayed in the spatial light modulator 25. The storing section 31 may store the phase pattern with which positions irradiated with the laser beam 21 in the surface of the plate-shaped workpiece 100 become the regions 123 (see FIG. 4) corresponding to the semiconductor chips 120 when the spatial light modulator 25 is caused to display the phase pattern. In this case, the profile of the laser beam 21 when the phase pattern is displayed by the spatial light modulator 25 corresponds with the outer shape of the semiconductor chip 120. The irradiation range irradiated with the laser beam 21 may correspond to one semiconductor chip 120 or may correspond to a plurality of semiconductor chips 120.

The rotation instructing section 32 rotates the phase pattern stored in the storing section 31. That is, the rotation instructing section 32 rotates the phase pattern to be displayed in the spatial light modulator 25, and rotates the profile of the laser beam 21 with which the irradiation-target surface of the plate-shaped workpiece 100 is irradiated. For example, the rotation instructing section 32 rotates the phase pattern in such a manner that the profile of the laser beam 21 rotates around the center of the semiconductor chip 120 with respect to the semiconductor chip 120 whose shape in plan view is a square shape. The rotation instructing section 32 may rotate the phase pattern by 90° in every predetermined time, for example.

The laser beam irradiation apparatus 1 irradiates the plate-shaped workpiece 100 on the holding table 10 with the laser beam 21 in the state in which the spatial light modulator 25 is caused to display the phase pattern stored in the storing section 31. The regions 123 (see FIG. 4) corresponding to the semiconductor chips 120 are irradiated with the laser beam 21, and reflow of the bumps 130 included in the irradiated range of the laser beam 21 is caused.

Figure 4:
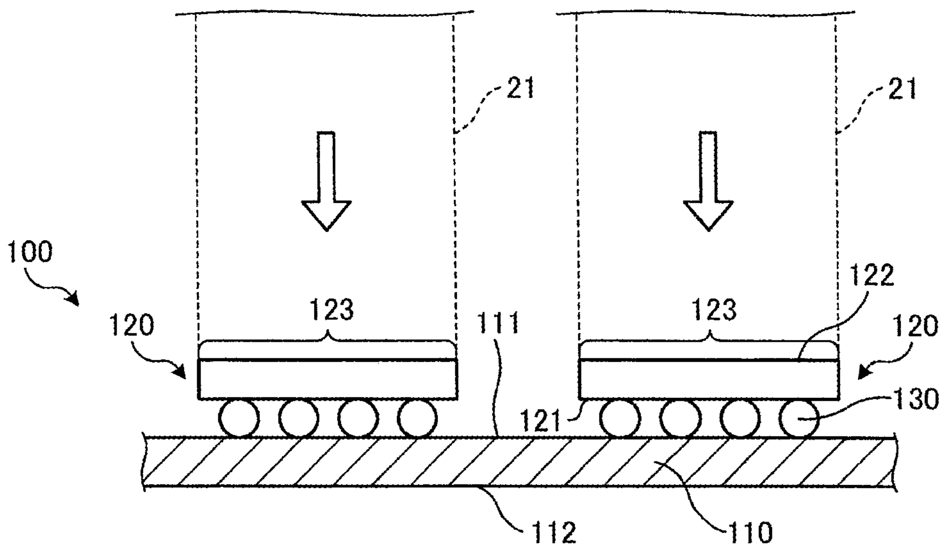
FIG. 4 is a sectional view of the major part illustrating the state in which the plate-shaped workpiece illustrated in FIG. 2

Next, description will be made about operation, by the laser beam irradiation apparatus 1, of irradiating the plate-shaped workpiece 100 of the embodiment in which the side of the back surface 112 is held by the holding table 10 with the laser beam 21 and causing reflow of the bumps 130. FIG. 4 is a sectional view of the major part illustrating the state in which the plate-shaped workpiece 100 illustrated in FIG. 2 and FIG. 3 is irradiated with the laser beam 21.

First, the laser beam irradiation apparatus 1 causes the spatial light modulator 25 of the laser beam irradiation unit 20 illustrated in FIG. 1 to display the phase pattern stored in the storing section 31. The phase pattern is a phase pattern that modulates the laser beam 21 to cause the irradiation region of the laser beam 21 modulated by the spatial light modulator 25 to become the regions 123 corresponding to the semiconductor chips 120 as illustrated in FIG. 4. In the embodiment, the profile of the laser beam 21 that is modulated by the spatial light modulator 25 in which the phase pattern is displayed and that is subjected to image formation on the irradiation-target surface of the plate-shaped workpiece 100 is along the outer shape of one semiconductor chip 120 whose shape in plan view is a square shape, as illustrated in FIG. 5.

Next, as illustrated in FIG. 4, the laser beam irradiation apparatus 1 executes irradiation with the laser beam 21 from the side of the front surface 111 of the plate-shaped workpiece 100. As a result, irradiation with the laser beam 21 modulated by the phase pattern is executed from the one surfaces (the back surfaces 122) on the side opposite to the other surfaces (the front surfaces 121) having the bumps 130 in the semiconductor chips 120. At this time, the profile of the laser beam 21 in the irradiation-target surface in the irradiation range is along the outer shape of the semiconductor chip 120 as illustrated in FIG. 5. The laser beam irradiation apparatus 1 executes the irradiation with the laser beam 21 for one second, for example.

Figure 5:
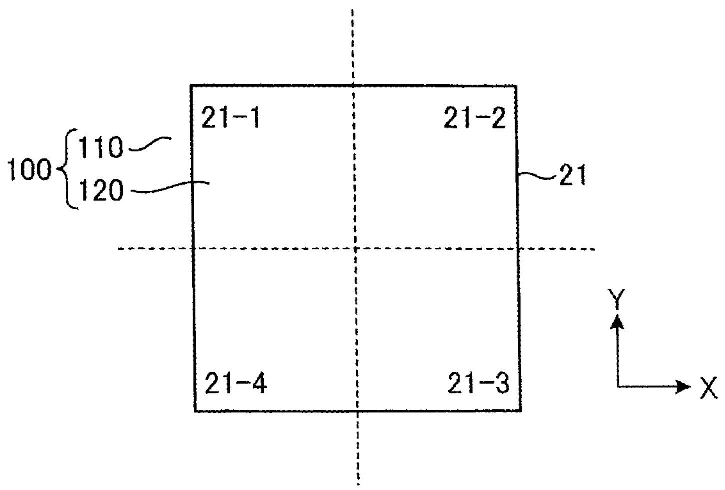
FIG. 5 is a plan view schematically illustrating the profile of the laser beam with which the plate-shaped workpiece illustrated in FIG. 2
Figure 6:
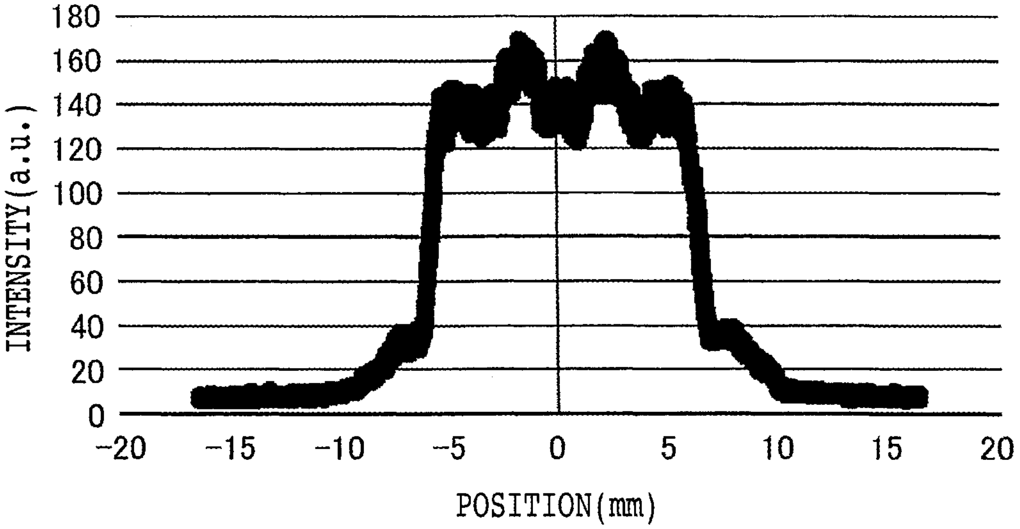
FIG. 6 is a graph illustrating intensity distribution, in an X-axis direction cross-section, of the laser beam illustrated in FIG. 5.
Figure 7:
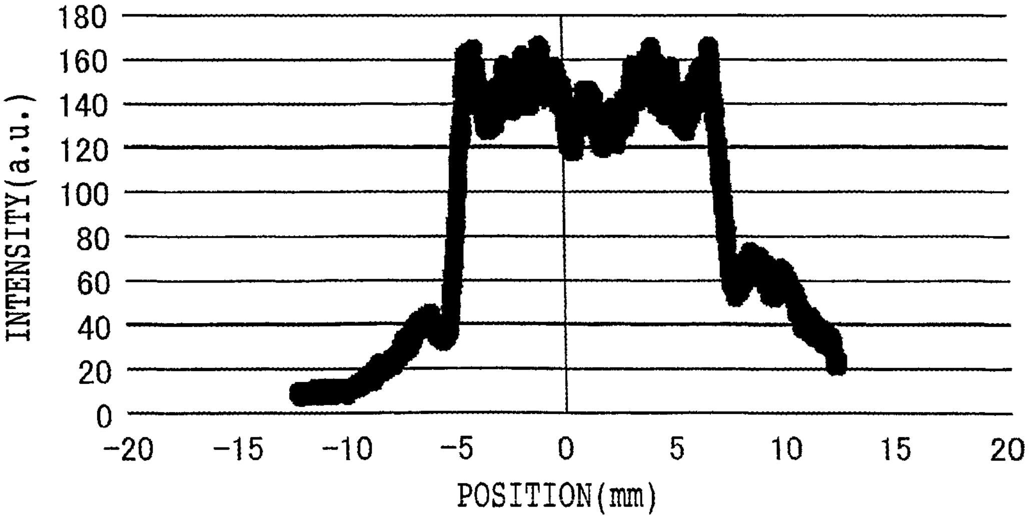
FIG. 7 is a graph illustrating intensity distribution, in a Y-axis direction cross-section, of the laser beam illustrated in FIG. 5.

Here, intensity distributions of the laser beam 21 illustrated in FIG. 5 are illustrated in FIG. 6 and FIG. 7. FIG. 5 is a plan view schematically illustrating the profile of the laser beam 21 with which the plate-shaped workpiece 100 illustrated in FIG. 2 and FIG. 3 is irradiated. FIG. 6 is a graph illustrating the intensity distribution, in an X-axis direction cross-section, of the laser beam 21 illustrated in FIG. 5. FIG. 7 is a graph illustrating the intensity distribution, in a Y-axis direction cross-section, of the laser beam 21 illustrated in FIG. 5. The X-axis direction cross-section is a cross-section that is parallel to an X-axis direction illustrated in FIG. 5 and passes through the center of the plate-shaped workpiece 100, and is a cross-section at a position indicated by a dotted line parallel to the X-axis in FIG. 5. Further, the Y-axis direction cross-section is a cross-section that is parallel to a Y-axis direction illustrated in FIG. 5 and passes through the center of the plate-shaped workpiece 100, and is a cross-section at a position indicated by a dotted line parallel to the Y-axis in FIG. 5.

In the case of causing the profile of the laser beam 21 to be along the outer shape of the semiconductor chip 120, it is ideal that the intensity distribution of the laser beam 21 passing through a cross-section of the plate-shaped workpiece 100 has a rectangular wave shape in which the skirts have a steep shape and the top is flat, in order to suppress heating unevenness. That is, it is preferable that the intensity of the laser beam 21 approximate zero outside the outer edge of the semiconductor chip 120 and that the intensity of the laser beam 21 be a constant intensity inside the outer edge of the semiconductor chip 120.

As illustrated in FIG. 6 and FIG. 7, in the laser beam 21 of the embodiment illustrated in FIG. 5, variation is caused in the intensity of the laser beam 21 inside the outer edge of the semiconductor chip 120. Further, the intensity distribution in the X-axis direction cross-section illustrated in FIG. 6 indicates a tendency that the intensity at a central part and an outer edge part of the plate-shaped workpiece 100 is low and the intensity at a part between the central part and the outer edge part is high. In contrast, the intensity distribution in the Y-axis direction cross-section illustrated in FIG. 7 indicates a tendency that the intensity at the outer edge part is high and the intensity at the central part is low. Because the tendency of the intensity distribution differs between the X-axis direction cross-section and the Y-axis direction cross-section as above, it turns out that the rotational symmetry is low.

Figure 8:
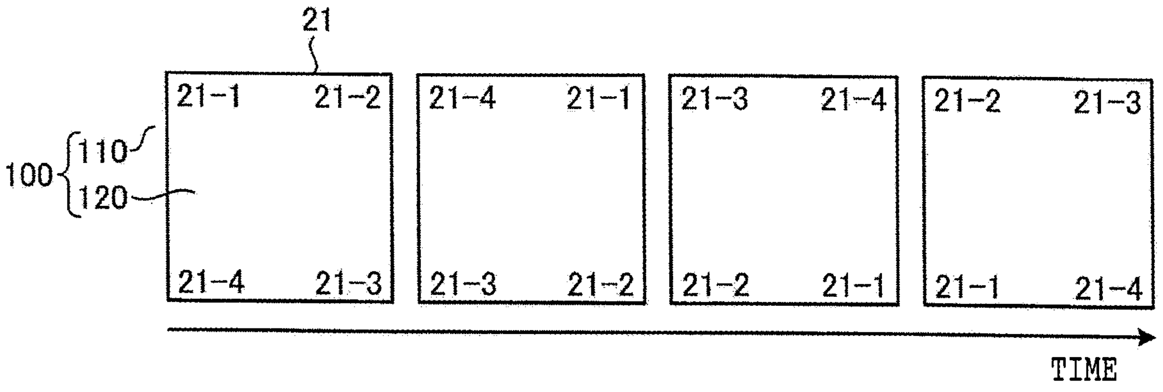
FIG. 8 is a plan view illustrating the state in which a phase pattern is rotated with respect to the laser beam illustrated in FIG. 5.

FIG. 8 is a plan view illustrating the state in which the phase pattern is rotated with respect to the laser beam 21 illustrated in FIG. 5. After irradiating the semiconductor chip 120 with the laser beam 21 having the profile illustrated in FIG. 5, the laser beam irradiation apparatus 1 rotates the phase pattern that the spatial light modulator 25 of the laser beam irradiation unit 20 is caused to display.

Specifically, the profile of the laser beam 21 is sequentially rotated by 90° increments around the center by sequentially rotating the phase pattern by 90° increments in such a manner that four small square regions 21-1, 21-2, 21-3, and 21-4 obtained by halving the irradiation range of the laser beam 21 illustrated in FIG. 5 in each of the X-axis direction and the Y-axis direction each rotationally move to the adjacent region in a clockwise manner. That is, for example, the region 21-1 rotationally moves around the center of the irradiation range of the laser beam 21 illustrated in FIG. 5 and FIG. 8 to sequentially move to the upper left, the upper right, the lower right, and the lower left in the irradiation range.

While executing the irradiation with the laser beam 21, the laser beam irradiation apparatus 1 rotates the phase pattern that the spatial light modulator 25 is caused to display, by 90° in every 0.25 seconds, for example. The laser beam irradiation apparatus 1 may rotate the phase pattern that the spatial light modulator 25 is caused to display, by 90° in every 0.125 seconds, making two revolutions. Owing to this, the rotational symmetry of the intensity distribution of the laser beam 21 with which the semiconductor chip 120 is irradiated is improved, reflow of the bumps 130 corresponding to the whole surface of the semiconductor chip 120 is caused, and the semiconductor chip 120 is connected to the substrate 110.

As described above, in irradiation with the laser beam 21, the laser beam irradiation apparatus 1 of the embodiment rotates, in the surface of the plate-shaped workpiece 100, the irradiation range of the laser beam 21 with which the semiconductor chip 120 is irradiated, by rotating the phase pattern that the spatial light modulator 25 is caused to display. This can improve the rotational symmetry of the intensity distribution of the laser beam 21 with which the semiconductor chip 120 is irradiated and uniformize the power density in the irradiation range. Because heating unevenness with respect to the bumps 130 can be suppressed, reflow of the bumps 130 corresponding to the whole surface of the semiconductor chip 120 is caused more surely, and failure of connection of the semiconductor chip 120 to the substrate 110 can be suppressed.

Further, the time taken for switching of the phase pattern of the spatial light modulator 25 is short compared with the case in which the holding table 10 or the image forming unit that executes image formation of the laser beam 21 on the plate-shaped workpiece 100 is physically rotated. This contributes to improvement in the productivity. The time required for rotational movement of the holding table 10 is, for example, approximately one second, and the time required for rotation of the phase pattern is, for example, approximately 30 milliseconds.

That is, for example, in the case in which irradiation with the laser beam 21 is executed with the semiconductor chip 120 rotated by 90° increments to make one revolution as illustrated in FIG. 8, when the semiconductor chip 120 as the irradiation target is switched through rotational movement of the holding table 10, it takes three seconds to execute the rotational movement (one second×three times of rotation), and it takes one second to execute the laser beam irradiation (0.25 seconds×four times). That is, the time required in total is four seconds. When the center of the semiconductor chip 120 deviates from the center of the holding table 10, movement to the rotation center occurs in addition to the rotational movement, and therefore, the required time further increases.

In contrast, in the embodiment, it takes 90 milliseconds to rotate the phase pattern (30 milliseconds×three times of rotation), and it takes one second to execute the laser beam irradiation (0.25 seconds×four times). That is, the time required in total is 1.9 seconds, and time shortening is possible.

The present invention is not limited to the above-described embodiment. That is, the present invention can be carried out with various modifications without departing from the gist of the present invention.

For example, the laser beam irradiation unit 20 does not necessarily need to include the uniform irradiation unit 23. Inclusion of the uniform irradiation unit 23 can uniformize the power density of the laser beam 21 at a higher degree. However, when uniformization of the power density in the present invention is sufficient, the uniform irradiation unit 23 may not be incorporated, and an inexpensive, simple configuration may thereby be implemented.

Further, the configuration is not limited to the form in which one phase pattern corresponds to irradiation of one semiconductor chip 120, and it is also possible that one phase pattern corresponds to irradiation of a plurality of semiconductor chips 120. That is, the irradiation may be executed for the semiconductor chips 120 one by one, or the irradiation may be simultaneously executed for a plurality of semiconductor chips 120.

Moreover, the image forming unit 26 includes the image forming system 27, the magnifying image forming lens 28, and the telecentric lens 29 that are disposed separately from the spatial light modulator 25 in the embodiment. However, the image forming unit 26 may be an image forming function that the spatial light modulator 25 has.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser beam irradiation apparatus comprising:

a holding table that holds a plate-shaped workpiece;

a laser beam irradiation unit that irradiates the plate-shaped workpiece held by the holding table with a laser beam; and a controller that controls the laser beam irradiation unit, wherein the laser beam irradiation unit includes a laser beam source that emits the laser beam, and a spatial light modulator that modulates the laser beam emitted from the laser beam source, according to a predetermined phase pattern, and emits the modulated laser beam, the controller has a storing section that stores the predetermined phase pattern to be displayed in the spatial light modulator, and a rotation instructing section that rotates the predetermined phase pattern stored in the storing section, and wherein the controller uniformizes a power density of the laser beam with which the plate-shaped workpiece is irradiated, by rotating the predetermined phase pattern by a predetermined angle while the plate-shaped workpiece is irradiated with the laser beam.

2. The laser beam irradiation apparatus according to claim 1, wherein the laser beam irradiation unit further includes an image forming unit that executes image formation of the laser beam modulated by the spatial light modulator, to execute irradiation of the plate-shaped workpiece.

3. The laser beam irradiation apparatus according to claim 2, wherein the plate-shaped workpiece includes a substrate over which a plurality of semiconductor chips having bumps on one surface are mounted with interposition of the bumps, and reflow of the bumps included in an irradiated range of the laser beam is caused by irradiating a region corresponding to the semiconductor chips mounted over the substrate with the laser beam.

4. The laser beam irradiation apparatus according to claim 2, wherein the predetermined phase pattern is rotated by the predetermined angle every predetermined time period.

* * * * *